United States Patent
Marshall et al.

(10) Patent No.: US 6,370,891 B1
(45) Date of Patent: Apr. 16, 2002

(54) HEATING, VENTILATION, AIR CONDITIONER PERFORMANCE TEST SYSTEM

(75) Inventors: Maureen L Marshall, Royal Oak, MI (US); Djura Vudrag, Windsor (CA); Dennis K Rideout, Gurley; Ray E Currier, Jr., Guntersville, both of AL (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/475,622

(22) Filed: Dec. 30, 1999

(51) Int. Cl.$^7$ .................................................. G01K 13/00
(52) U.S. Cl. ........................................ 62/130; 236/94
(58) Field of Search ........................... 62/125, 129, 130; 165/11.1; 236/94

(56) References Cited

U.S. PATENT DOCUMENTS

| | | | |
|---|---|---|---|
| 3,686,954 A | | 8/1972 | Motl |
| 4,770,044 A | | 9/1988 | Ferris |
| 4,827,730 A | * | 5/1989 | Doi et al. ...................... 62/129 |
| 4,967,567 A | * | 11/1990 | Proctor et al. ................ 62/129 |
| 5,042,265 A | * | 8/1991 | Baldwin et al. ............... 62/130 |
| 5,113,665 A | | 5/1992 | Katsuki |
| 5,172,561 A | * | 12/1992 | Hanson et al. ................ 62/130 |
| 5,395,042 A | | 3/1995 | Riley et al. |
| 5,495,722 A | | 3/1996 | Manson et al. |
| 5,824,921 A | * | 10/1998 | Kanai ........................... 62/125 |

* cited by examiner

Primary Examiner—William E. Tapolcal
Assistant Examiner—Mohammad M Ali
(74) Attorney, Agent, or Firm—Edwin W. Bacon, Jr.

(57) ABSTRACT

A heating, ventilation, air conditioner (HEVAC) test system which includes a test unit which determines the temperature of the air exhausted from a HEVAC unit, an ambient temperature unit, and a work cell controller, all of which can be wirelessly interconnected into a network. The vehicle HEVAC unit is tested and passed or failed in accordance with the ambient temperature and the time it takes for the HEVAC exhaust air to vary a predetermined number of degrees. A test probe is also disclosed which ensures proper placement of the temperature sensor and maintains proper placement of the temperature sensor over the test period.

18 Claims, 8 Drawing Sheets

HEATING, VENTILATION, AIR CONDITIONER PERFORMANCE TEST SYSTEM

FIELD OF THE INVENTION

The present invention relates generally to vehicle heating ventilation, and air conditioner systems, and more particularly to systems, components, and methods for testing for proper operation of such systems.

BACKGROUND

Most passenger vehicles are built with heating, ventilation, and air conditioner systems (HEVAC). As is well known, the purpose of a HEVAC system is to introduce temperature adjusted air into the passenger compartment of a vehicle in order to provide a more comfortable environment for the vehicle occupants. Present HEVAC systems have become more sophisticated and may include climate controls, front and rear vents, and vehicle zone controls.

Although HEVAC systems have become more sophisticated, methods of testing a HEVAC system installed in a vehicle during vehicle assembly have remained relatively unsophisticated. With particular respect to an air conditioner AC system, in many assembly plants, operators use a meat thermometer placed in the center instrument panel vent. The operator then switches the blower to high speed, moves the AC temperature control to a cold setting, and monitors the temperature for a period of approximately two minutes. The operator monitors the temperature drop from the initial temperature in order to determine if the AC system passes or fails this test. The operator then may go to a remote, off-line terminal or keyboard to enter such information into a quality control system. Similar test methods are employed to test the heater portion of a HEVAC system.

The present system is inherently inaccurate due to the use of meat thermometers or similar instruments which measure temperature over such a wide range. The temperature drop monitored by the operator is a very small portion of the entire scale of the thermometer, thereby reducing accuracy. While some test systems utilize a digital thermometer, the quality and accuracy of such digital thermometers is approximately the same as the meat thermometer, and the digital thermometers also rely on battery levels which can adversely affect accuracy of the readings. The dial or digital thermometers presently utilized having a very small viewing area and are difficult to see during the assembly operation without being relatively close to the viewing scale. The dial type thermometers further require that the operator read the location of a pointer on a relatively fine scale to determine initial and end readings. Operators often misread the scale or wait until the temperature has dropped more than the drop which the operator actually seeks in order to ensure that the vehicle has passed. Digital and analog thermometers both require that the operator perform a calculation to determine the end temperature, which is based on subtracting the initial desired drop from the initial temperature. Such calculations require additional process time.

The test operation also typically fails to include any time marking device so that the operator can measure the time over which temperature drop occurs. Therefore, the operator cannot certify that the temperature drop occurred within a predetermined time period. Further, the test process typically is a manual process and depends upon the operator following the procedures correctly in order to ensure consistency and quality of the test procedure. Inconsistencies may also be introduced if the operator chooses to use a feel test with a hand and/or if estimating the time rather than properly measuring the time. A manual process also requires that the operator commit a series of steps to memory and perform these steps repeatedly without prompting. Such systems require that new operators receive sufficient training before performing the test.

Because many vehicles are now equipped with dual zone systems, manually testing a dual zone system often proves difficult. The operator must monitor and remember test temperatures for one or two zones, times for both zones, and end temperatures at two different time periods. Such a complex test procedure often proves difficult to follow and often results in the operator concentrating on one zone, rather than two.

Present systems also do not provide sufficient verification that a proper test has occurred for a particular vehicle, as such testing often depends upon the operator properly reviewing build information for the vehicle. The present systems also provide inconsistent reporting and data tracking for each test. In particular, present systems record only a pass/fail indication, even if the pass/fail indication is entered into a database. Present systems also do not track the actual ambient temperature and humidity and drop times so that process performance can be properly documented. If the ambient temperature and/or the vehicle compartment temperature is not determined prior to the test, the test could be inaccurate for extreme vehicle temperatures, which can often occur in assembly plants.

Thus, there is a need for an improved air conditioning test system, method, and components in order to address the above-described issues.

SUMMARY OF THE INVENTION

This invention is directed to an automated system for testing a vehicle heating, ventilation, air conditioner (AC) unit. The system includes an ambient test unit. The ambient test unit includes an ambient temperature sensor placed in proximity to the vehicle. The ambient temperature sensor generates an ambient temperature signal that varies in accordance with the ambient temperature. An AC temperature sensor is placed in proximity to an AC vent. The AC temperature sensor generates an AC temperature signal that varies in accordance with the temperature of air exhausted from the AC vent. An AC test controller varies operation of the AC unit. An AC test unit which receives the AC temperature signal and the ambient temperature signal and determines if the AC temperature is within predefined limits in accordance with the ambient temperature and the operation of the AC unit.

This invention is also directed to a method for testing a vehicle heating, ventilation, air conditioner (HEVAC) unit. The method includes placing an HEVAC temperature probe in proximity to an exhaust vent of the HEVAC unit. The HEVAC temperature probe generates an HEVAC temperature signal that varies in accordance with an HEVAC temperature of air exhausted from the first exhaust vent. The method also includes determining an ambient temperature of air in proximity to the vehicle and operating the HEVAC unit to cause the exhaust air to exhaust from the first exhaust vent. The HEVAC temperature and the ambient temperature are compared and the time period over which the HEVAC temperature drops by a predetermined temperature value is determined. The time period over which the HEVAC temperature drops is compared to a predetermined time period to determine if the HEVAC system is operating properly.

The invention is also directed to an apparatus for sensing a temperature of air exhausted from an air conditioner (HEVAC) vent. The apparatus includes a temperature sensor having a body and a sensing section for receiving the air exhausted from the HEVAC vent. A holder receives the body of the temperature sensor, and a head receives the sensing section of the temperature sensor. The head has a window for enabling the HEVAC exhaust air to pass through the head and in proximity the sensing section. A fastener fastens the head in proximity to the exhaust vent and is arranged to maintain a predetermined orientation of the head with respect to the exhaust vent.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
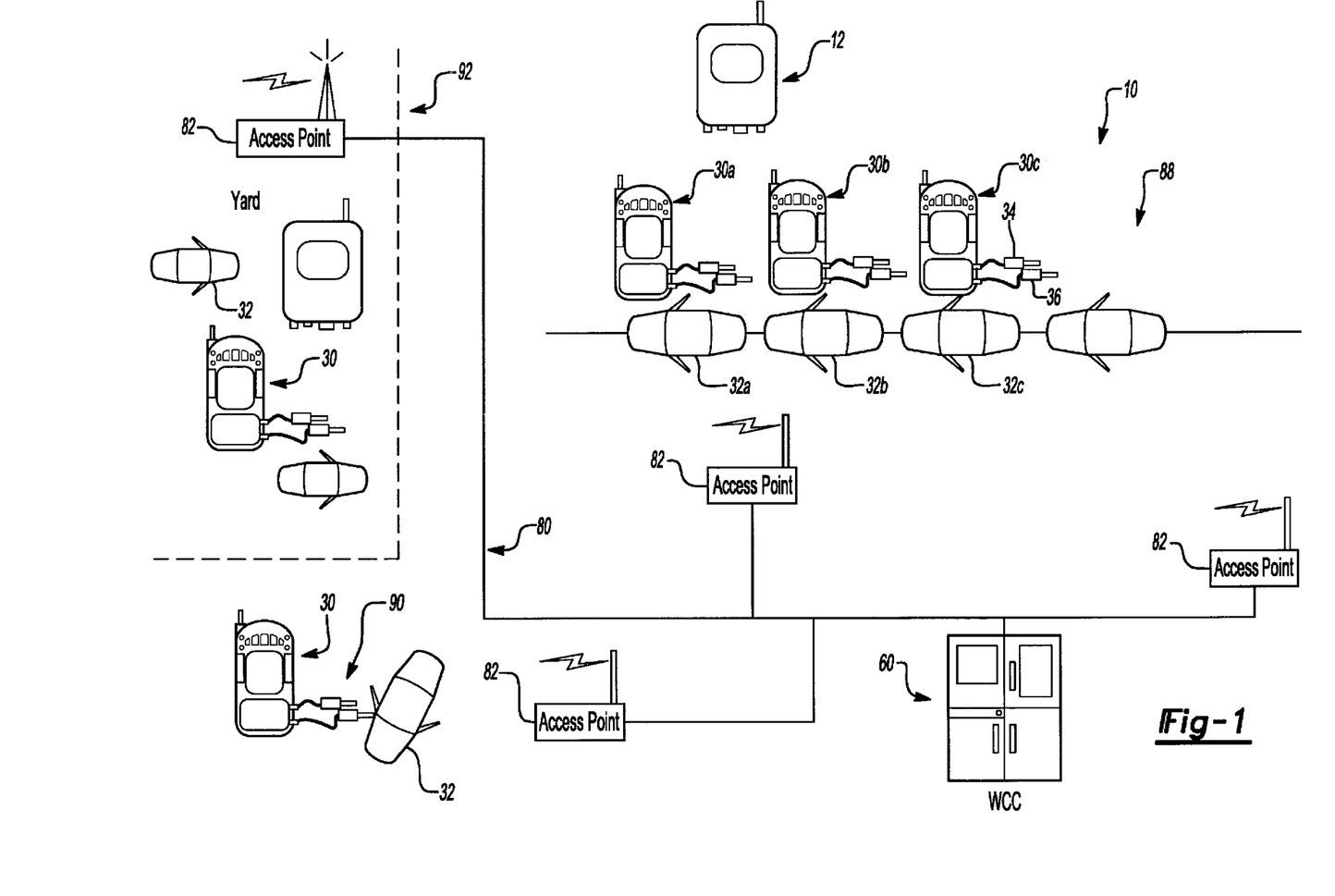
FIG. 1 is a system diagram of the HEVAC test system arranged in accordance with the principles of the present invention.

With reference to the figures, FIG. 1 depicts a system diagram of the air heating, ventilation, and air conditioner (HEVAC) test system 10 arranged in accordance with the principles of the present invention. HEVAC test system 10 includes an ambient sensor unit 12. Ambient sensor unit 12 detects the ambient temperature and, optionally, the ambient relative humidity in the assembly environment, particularly in and around the assembly area where the entirety or portions of the HEVAC system are to be tested.

Figure 2:
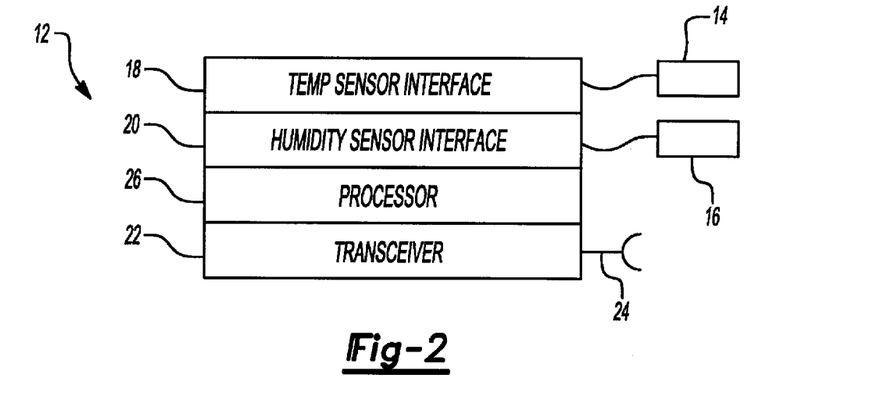
FIG. 2 is a block diagram of the ambient temperature and humidity sensor of FIG. 1.

As best seen in FIGS. 1 and 2, ambient sensor unit 12 includes a temperature sensor 14 and, optionally, a relative humidity sensor 16. Temperature sensor 14 provides an electrical output signal to temperature sensor interface 18. Similarly, relative humidity sensor 16 generates an electrical output signal received by humidity sensor interface 20. As shown in FIGS. 1 and 2, ambient sensor unit 12 is a wireless unit which includes a transceiver 22 which sends and receives radio frequency (RF) signals via antenna 24. A processor 26 receives electronic signals from temperature sensor interface 18, humidity sensor interface 20, and transceiver 22, and monitors sensor readings, converts sensor reading data into a temperature, and oversees transmission and reception of radio signals via transceiver 22.

Temperature sensor interface 18 receives a signal from temperature sensor 14 which varies in accordance with the ambient temperature. Similarly, humidity sensor interface 20 receives a signal from relative humidity sensor 16 which varies in accordance with the relative humidity. Temperature sensor interface 18 and humidity sensor interface 20 include signal conditioning circuitry to condition the respective received signals prior to input to processor 26. Processor 26, or the respective interfaces, include an analog-to-digital converter which receives an analog signal from temperature sensor 14 and relative humidity sensor 16 and converts the analog signal to a digital format to facilitate translation of the signal value to a temperature by processor 26.

Figure 3:
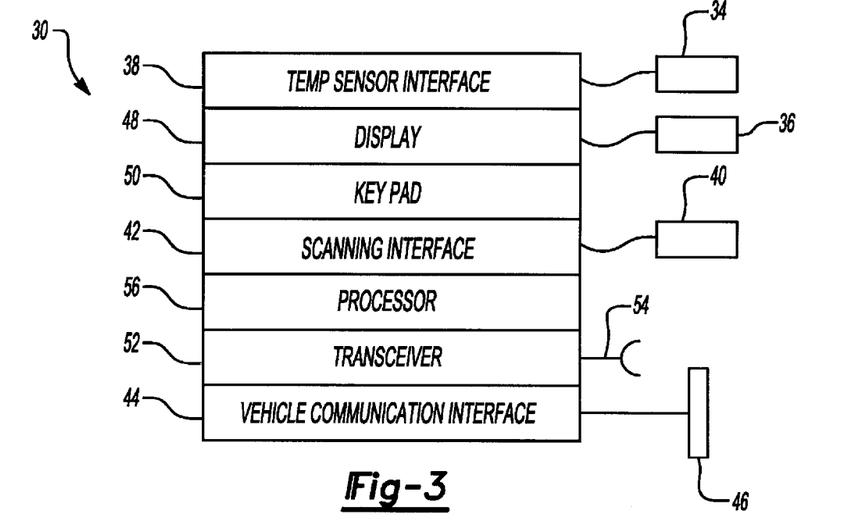
FIG. 3 is a block diagram of the test unit of FIG. 1.

As best seen in FIGS. 1 and 3, HEVAC test system 10 also includes one or a number of test units 30a, 30b, 30c, which will be referred to collectively as test unit 30. Test unit 30 is situated in proximity to respective vehicles 32a, 32b, 32c, referred to collectively as vehicle 32, having HEVAC systems. Test unit 30 controls many functions of vehicle 32 in order to perform various test operations, including the HEVAC tests described herein. In particular, test unit 30 includes a first temperature sensor 34 and, optionally, for dual zone vehicles, a second temperature sensor 36. The first and second zones may correspond to front and rear zones or driver and passenger zones. Temperature sensors 34 and 36 generate electrical signals which vary in accordance with the temperature of air exhausted by the HEVAC system to temperature sensor interface 38. Temperature sensor interface 38 operates as described above with respect to temperature sensor interface 18. Specifically, temperature sensor interface receives the varying signals from one or both of front temperature sensor 34 and rear temperature sensor 36 and includes circuitry to condition the received signal in preparation for input to a test unit processor, as will be described herein.

Test unit 30 also includes a scanner 40, such as a bar code scanner. When passed over a bar code tag, scanner 40 outputs a signal to scanner interface 42 which converts the bar code into identifying data, such as a vehicle identification number (VIN) for vehicle 32. Test unit 30 also includes a vehicle communication interface 44 which enables communication between test unit 30 and a vehicle diagnostic bus (VDB). Through vehicle diagnostic bus, test unit 30 can control operation of various vehicle functions in order to affect testing of the several vehicle systems. Such functions include temperature and blower control of the HEVAC system 10, operation of the lighting system, and operation of other electronic controls connected to the VDB. Vehicle communication interface 44 connects to the VDB through bus connector 46.

Test unit 30 provides for communication between the operator and test unit 30 via a display 48 and a keypad 50. Display 48 provides messages to prompt the operator for information and to guide the operator through the test steps. Keypad 50 enables the operator to input information to test unit 30.

Similar to ambient sensor unit 12, test unit 30 includes a transceiver 52 for sending and receiving electromagnetic signals, such as RF signals via antenna 54. Transceiver 52 enables wireless communication between test unit 30 and a network, as will be described herein, to facilitate portability of test unit 30. Test unit 30 also includes a processor 56 which manages interaction between the respective components of test unit 30 and controls operation of the vehicle through vehicle communication interface 44.

Figure 4:
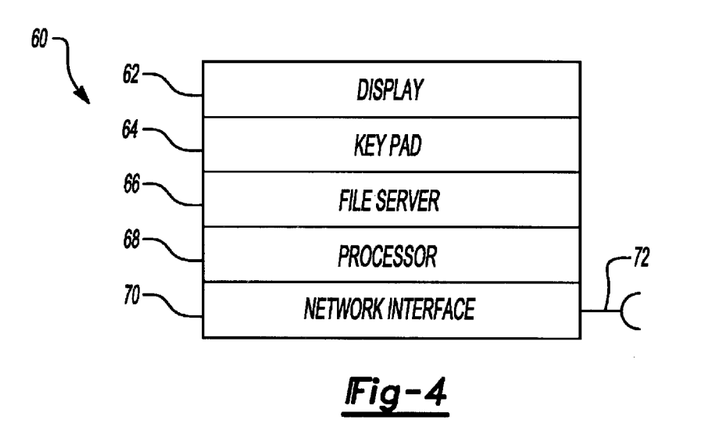
FIG. 4 is a block diagram of the work cell controller of FIG. 1.

As best seen in FIGS. 1 and 4, HEVAC test system 10 also includes a work cell controller 60. Work cell controller 60 is a computer and file server that provides a link between HEVAC test system 10 through a wireless network, as will be described herein, and plant production and quality control systems. Work cell controller 60 includes a display for providing messages to an operator, and a keypad 64, or other operator interface device, to enable the operator to provide information to work cell controller 60. Work cell controller 60 also includes a file server 66 which stores build information for each vehicle to be assembled based on vehicle identification number. This enables the test unit 30 to execute specific tests based on the feature content of each particular vehicle. A network interface 70 enables both hardwired and wireless communication through a network. Wireless communication occurs through an RF link, and communication signals may be sent through antenna 72.

Interconnection of ambient temperature unit 12, test unit 30, and work cell controller 60 may occur via a hardwired or a wireless network. As shown herein, communication occurs through a wireless network in which ambient sensor unit 12, test unit 30, and work cell controller 60 interconnect via RF, or other electromagnetic, communication. A network 80 provides a digital radio interface between ambient sensor unit 12, test unit 30, and work cell controller 60. Network 80 includes a plurality of access points 82 which provide transmit and receive points for wirelessly communicating with each of ambient sensor unit 12, test unit 30, and work cell controller 60. Network 80 also includes a network management protocol, such as an Ethernet, or other local area network link, that utilize access points 82. The number of access points 82 depends upon the amount and range of coverage needed for a particular application. For example, a typical assembly facility configuration includes a final line 88, a repair area 90, and a storage yard 92, each of which may be located remotely from each other. Accordingly, access points 82 may be placed in proximity to such locations to enable sufficient communication between the respective units.

A particular feature of the present invention can be found with respect to the configuration of either the first zone (front) temperature sensor 34 or the second zone (rear) temperature sensor 36. In particular, the configuration of the temperature sensor ensures proper placement of the sensor to maximize reliability of the test. In particular, with reference to FIGS. 5–7, a temperature sensor probe 100 houses temperature sensor 102.

Figure 5:
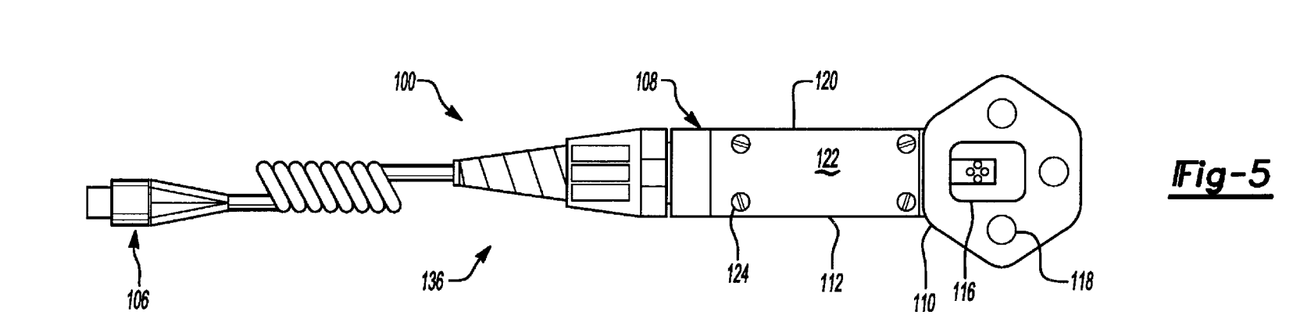
FIG. 5 is an assembled view of the HEVAC test probe of the present invention.
Figures 6, 7:
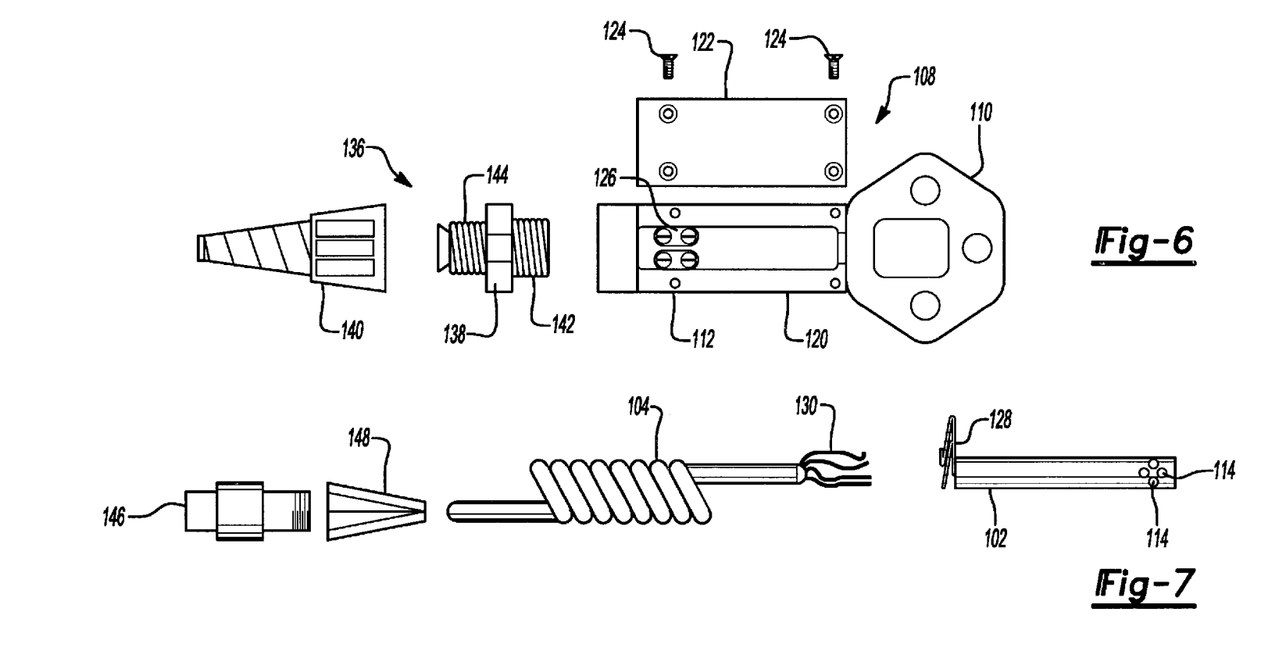
FIG. 6 is an exploded view of the holder portion of the test probe.
FIG. 7 is an exploded view of the temperature sensor portion of the test probe.

Temperature sensor 102 is housed within a probe holder 108. Probe holder 108 includes a head 110 and a body or handle 112. Temperature sensor 102 includes openings 114 through which air passes. The air passing through openings 114 causes temperature sensor 102 to generate an electrical signal that varies in accordance with the temperature of the air passing through openings 114. Head 110 includes a window 116, and openings 114 are preferably placed within window 116 so that air can pass through window 116 and openings 114. Head 110 also includes bolt holes 118 which receive retaining bolts, as will be described herein, which are inserted into the HEVAC exhaust vent in order to hold temperature probe 100 in place during the HEVAC system test.

Body 112 includes a central section 120 and a cover 122 which is secured to central section using fasteners 124. Central section 120 includes a jumper 126 which may be a screw or chinch connector. Jumper 126 receives at one end electrical conductors 128 of temperature probe 102. At the other end, jumper 126 receives electrical conductors 130 of retractable cable 104.

Temperature probe 100 also includes a gland nut strain relief connector 136 which connects retractable cable 104 to body 112 and also provides strain relief. Gland nut strain relief connector 136 includes an inner portion 138 and an outer portion 140. A first threaded end 142 of inner portion 138 threadably interconnects to body 112, and a second threaded end 144 of inner portion 138 receives outer portion 140 which is threaded onto second threaded end 144. Retractable cable 104 passes through inner portion 138 and outer portion 140 of Hubble connector 136. At its other end, cable 104 connects to connector plug 106. Connector plug 106 includes a connector portion 146 and a strain relief portion 148.

Figure 8:
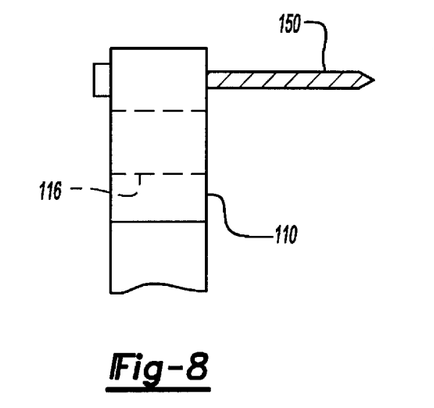
FIG. 8 is a side view of a first configuration of the head portion of the test probe.
Figure 9:
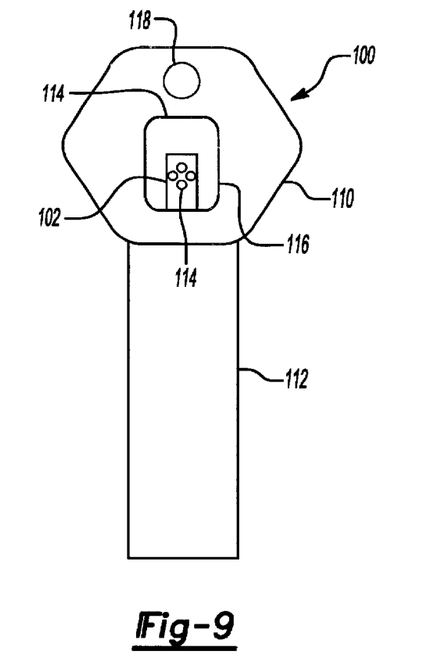
FIG. 9 is a front view of the head portion of the test probe.

FIGS. 8 and 9 depict a particular configuration for head 110 of temperature probe 100. As described above, probe 100 includes a head 112 having a window 116. Temperature sensor 102 is placed within head 110 so that openings 114 are placed within window 116. Head 110 of FIGS. 8 and 9 includes a bolt hole 118 formed above window 116. Bolt hole 118 receives a bolt 150. One end of bolt 150 is inserted into the air conditioning exhaust vent to properly place and to maintain temperature probe 100 in a preferred orientation within the exhaust vent during the HEVAC system test. Bolt 150 is preferably a bolt, or other similar fastener as is well known in the art, coated with urethane or other soft material in order to enable the bolt 150 to be inserted into the vent and to hold the temperature probe in position following insertion into the vent. Bolt 150 provides a friction fit within the air conditioning vent.

Figure 10:
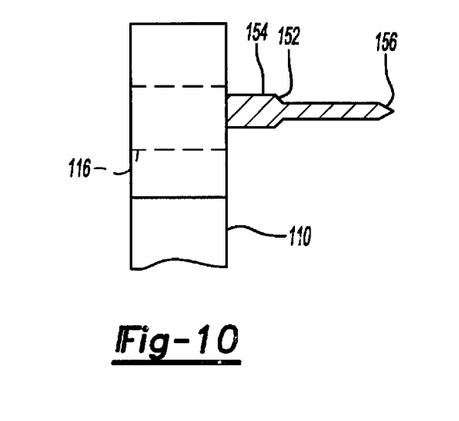
FIG. 10 is a side view of a second configuration of the head portion of the test probe.
Figure 11:
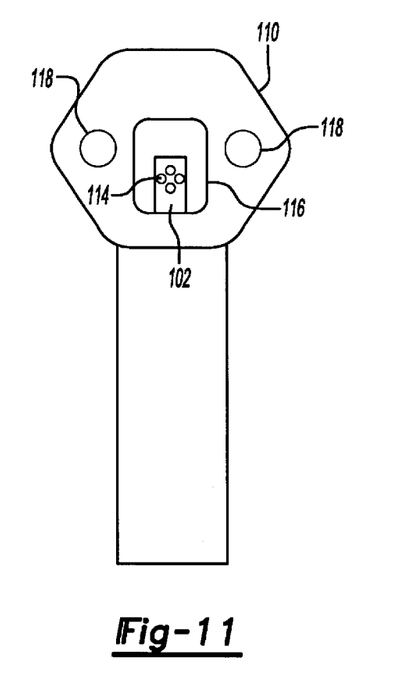
FIG. 11 is a front view of the second configuration of the test probe.

FIGS. 10 and 11 depict a similar configuration to FIGS. 8 and 9, but with bolt holes 118 placed to the sides of window 116, rather than above window 116. FIGS. 10 and 11 depict a bolt 152 having a thicker shank portion 154 and a thinner threaded portion 156. Bolt 152 may be formed as described above with respect to bolt 150. In particular, a typical bolt may be covered with a urethane coating. This protects the air conditioning exhaust vent from cosmetic damage and provides a friction fit to maintain temperature probe 100 in position during the test.

By varying the position of bolt holes 118 within head 110, the head 110 may be keyed to specific air conditioning vents in order to ensure that the operator places the probe in the optimum position for conducting the test. One skilled in the art will recognize that multiple bolts holes may be provided so that a single head may be configured to fit various HEVAC vents. Depending upon the number, size, and shape of the bolt holes placed within bolt holes 118.

Figure 12A:
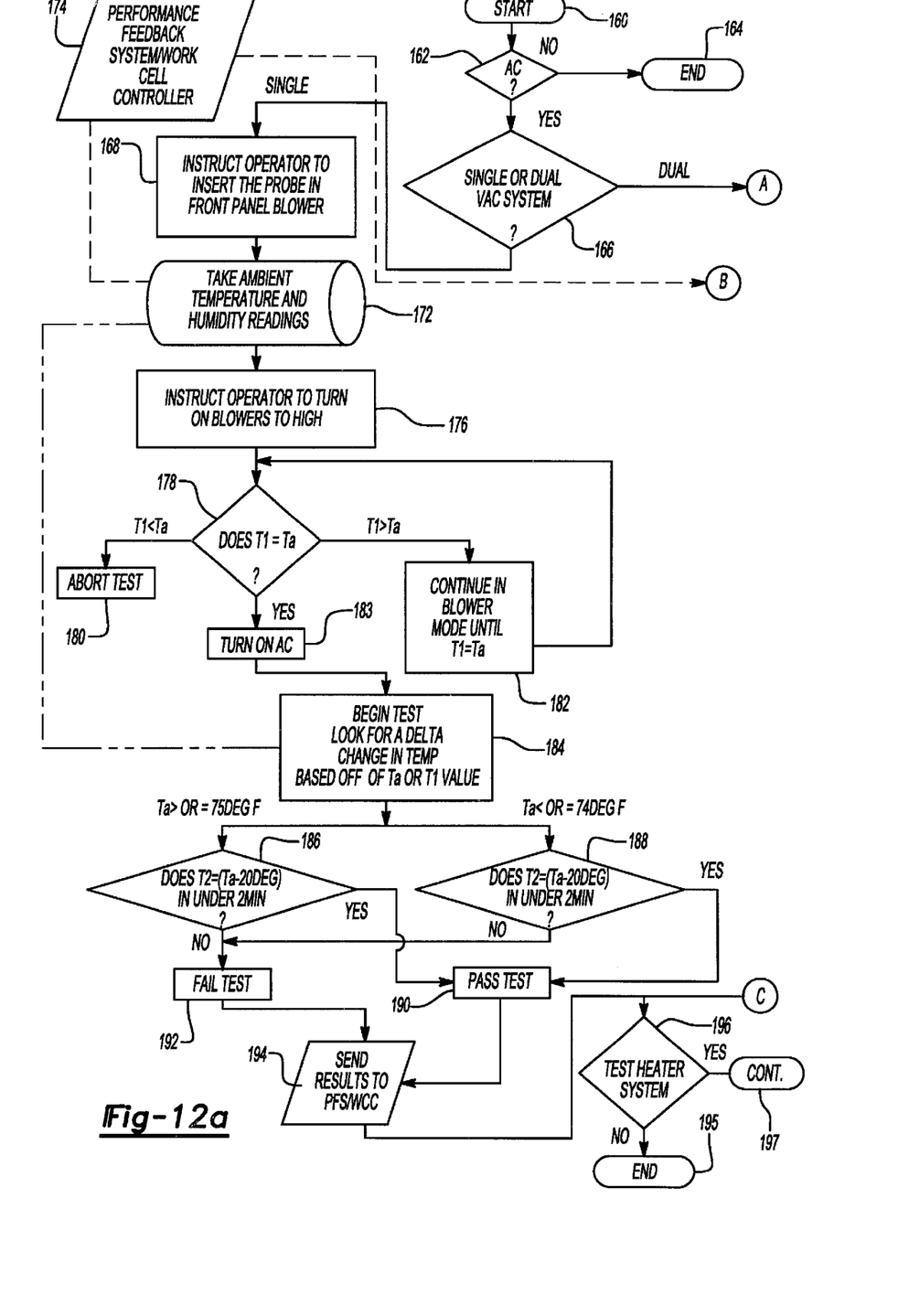
FIGS. 12a and 12b are a block diagram of the procedure for testing the AC portion of the HEVAC system.
Figure 12B:
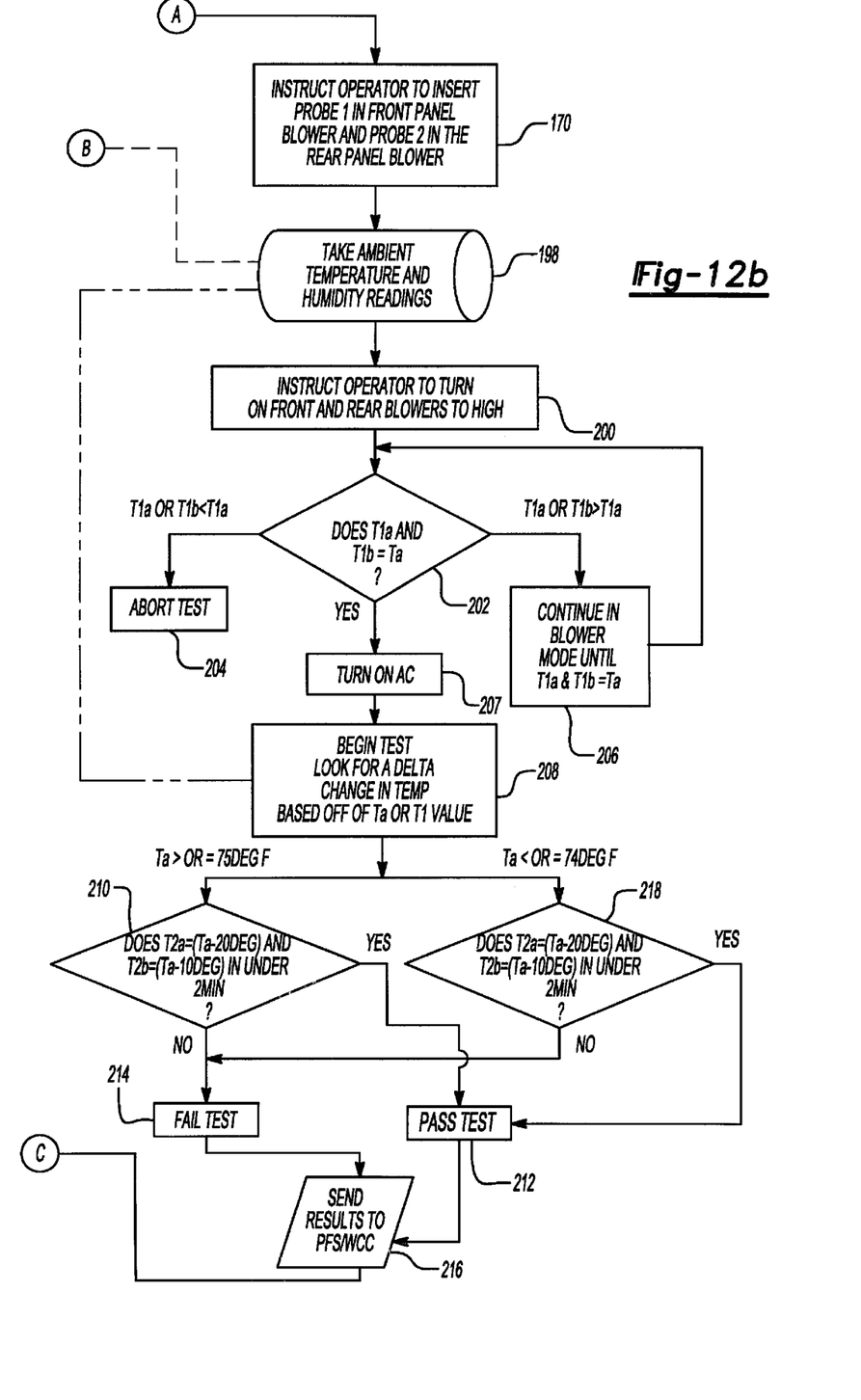

FIGS. 12a and 12b depicts a block diagram of a method for operating the AC test portion of the HEVAC test system 10 of the present invention. Control begins at start block 160 which generally indicates the beginning of the methodology. Control then proceeds to decision block 162 which determines whether the vehicle includes an AC system. If the vehicle does not include an AC system, control proceeds to end block 164. If the HEVAC system includes an AC system, control proceeds to decision block 166. Decision block 166 determines whether the AC system is a single or dual AC system.

The decisions made at decision blocks 162 and 166 typically are determined by having the operator utilize a bar code scanner 40 to scan the vehicle bar code to determine the VIN or manually enter the VIN number using the keypad 50 on test unit 30. Test unit 30 generates an RF signal detected by an access point 82. The RF signal is encoded to obtain build information from work cell controller 60. Work cell controller 60 looks up the VIN number and obtains build information based on the VIN number. The build information is then broadcast back to tester 30 so that a determination on whether the vehicle HEVAC system (1) has an AC system and (2) has a single or dual zone AC system.

Returning to decision block 166, if the system is a single zone system, control proceeds to process block 168. If the AC system is a dual zone system, control proceeds to process block 170. With respect to process block 168, tester 30 outputs instructions to the operator on display 48. The instructions direct the operator to insert the temperature probe into the front blower panel or exhaust vent. Control next proceeds to process block 172 where the ambient temperature and humidity readings are taken and stored in performance feedback system (PFS), which is a quality control system, and work cell controller 60, as shown in process block 174. Control next proceeds to process block 176. At process block 176, test unit 30 provides instructions on display 48 to instruct the operator to turn the blowers to high at the lowest temperature setting. Typically, the vehicle runs for approximately five seconds at this setting so that ambient air is output through the AC system. In a fully automated setting, test unit 30 could direct the vehicle through vehicle communication interface 44 to take these steps automatically, thereby eliminating the need to instruct the operator to do so.

Control next proceeds to decision block 178 where a test is performed to determine if the AC temperature (T1) detected by the probe is equal to the ambient temperature (Ta). If AC temperature T1 remains outside of the predetermined range around ambient temperature Ta for a predetermined, configurable time period, control proceeds to process block 180 where the test is aborted because such a scenario indicates that the vehicle can not achieve ambient temperature. Decision block 178 is repeated, as shown at process block 182, for a predetermined time period to enable AC temperature T1 to approach a predetermined, configurable range of temperatures around ambient temperature Ta.

Once the temperature T1 is approximately equal to the ambient temperature Ta, control proceeds to process block 183 where the AC system is activated and then to process block 184 which compares a newly determined AC temperature T2 against the ambient temperature Ta or previous AC temperature T1, both values of which are selectable based on plant and vehicle requirements. For this description, Ta will be used.

Depending upon the ambient temperature Ta, control proceeds to one of decision block 186 or decision block 188. If the ambient temperature Ta is greater than or equal to 75 degrees Fahrenheit, or other selected temperature, control proceeds to decision block 186 where a test is performed to determine if the AC temperature T2 reaches the ambient temperature Ta minus 20 degrees, or other selected temperature, in under two minutes. If so, control proceeds to process block 190 which generates a code indicating that the AC system has passed the test. If not, control proceeds to process block 192 which generates a code that indicates that the AC system has failed the test. From either of process blocks 190, 192, control proceeds to process block 194 which sends the pass/fail result, the ambient temperature Ta, ambient humidity, the AC temperatures T1 and T2, and other relevant data with a time stamp to PFS and WCC 174. Control then proceeds to decision block 196 which determines whether to test the heater portion of the HEVAC, system. If no heater test is performed, control proceeds to end block 195. If a heater test is required, control proceeds to continuation block 196 and the heater test begins.

Returning to process block 184, if the ambient temperature Ta is less than or equal to 74 degrees, control proceeds to decision block 188 which performs a test to determine if the AC temperature T2 becomes equal to the ambient temperature Ta minus 18 degrees, or other selectable temperature in less than two minutes, or other selectable time period. If so, control proceeds to process block 190 which generates a code indicating that the AC system has passed the test. If not, control proceeds to process block 192 which generates a code to indicate that the AC system has failed the test. Control then proceeds to process block 194 which sends the pass/fail result, Ta, the ambient humidity, the AC temperatures T1 and T2 and other relevant data with a time stamp to the PFS and WCC 174. Control then proceeds to decision block 196 which determines whether to test the heater portion of the HEVAC system. If no heater test is performed, control proceeds to end block 195. If a heater test is required, control proceeds to continuation block 196 and the heater test begins.

Returning to decision block 166, as stated above, for a dual zone system, front/back, passenger/driver, or other arrangement, control proceeds to process block 170 where a message is output on display 48 of test unit 30 instructing the operator to insert probe 1 into the front panel blower or exhaust vent (a first zone probe) and probe 2 into the rear panel blower or exhaust vent (a second zone probe). Control then proceeds to process block 198 where the ambient temperature Ta and humidity readings are taken through PFS and WCC 174. Control next proceeds to process block 200 where a message is provided on display 48 of test unit 30 instructing the operator to activate the front and rear blowers, i.e., the blowers for both zones, to high and select the lowest temperature setting for both zones. This enables ambient air to flow through the HEVAC system. This normally occurs for approximately five seconds.

Control next proceeds to decision block 202 which runs a test to determine if the AC temperature T1$a$ taken by probe 1 and the AC temperature T1$b$ taken by probe 2 are equal to the ambient temperature Ta. Decision block 202 is repeated for a predetermined time period to enable AC temperatures T1$a$ and T1$b$ to approach a predetermined, configurable range of temperatures around ambient temperature in a predetermined, configurable time period as shown at process block 206. Once the AC temperatures T1$a$ and T1$b$ fall within the predetermined range of ambient temperature Ta, control proceeds to process block 207 which activates the AC system and then to process block 208 which begins the test to determine the difference or delta between newly determined AC temperatures T2$a$ and T2$b$ and the ambient temperatures Ta or AC temperature T1, depending upon plant conditions such as ambient temperature and humidity. For the purpose of this description, Ta will be used.

If the ambient temperature Ta is greater than or equal to 75 degrees, control proceeds to decision block 210 where a test is performed to determine if the AC temperature T2$a$ is equal to the ambient temperature Ta minus 20 degrees Fahrenheit, or other selectable temperature, whether the rear AC temperature T2b is equal to the ambient temperature Ta minus 10 degrees Fahrenheit, or other selectable temperature, and whether both scenarios occur in less than two minutes, or other selectable time period. If so, control proceeds to process block 212 which generates a pass code for the AC system. Control next proceeds to process block 216 which sends the pass/fail result, the ambient temperature Ta, the ambient humidity, the AC temperatures T1a, T1b, T2a, T2b, and other relevant data, with a time stamp to PFS and WCC 174.

If the above-described temperature drops do not occur in the predetermined time period, control proceeds to process block 214 where a fail code for the test is generated. Control next proceeds to process block 216 which sends the pass/fail result, the ambient temperature Ta, the ambient humidity, the AC temperatures T1a, T1b, T2a, T2b, and other relevant data, with a time stamp to PFS and WCC 174. Control them process to decision block 196 which determines whether to test the heater portion of the HEVAC system. If no heater test is performed, control proceeds to end block 195. If a heater test is required, control proceeds to continuation block 196 and the heater test begins.

Returning to process block 208, if the ambient temperature is less than or equal to 74 degrees, a test is performed at decision block 218 to determine AC temperature T2a is equal to the ambient temperature Ta minus 18 degrees, or other selectable temperature, whether the AC temperature T2b, is equal to the ambient temperature Ta minus 8 degrees, or other selectable temperature, and whether both occur under two minutes, or other selectable time period. If so, control proceeds to process block 212 which generates a pass code for the test. If not, control proceeds to process block 214 which generates a fail code for the test. In either scenario, control proceeds to process block 216 which sends the pass/fail result, the ambient temperature Ta, the ambient humidity, the AC temperatures T1a, T1b, T2a, T2b, and other relevant data with a time stamp to PFS and WCC 174. Control then proceeds to decision block 196 which determines whether to test the heater portion of the HEVAC system. If no heater test is performed, control proceeds to end block 195. If a heater test is required, control proceeds to continuation block 196 and the heater test begins.

As discussed above at blocks 195, 196, and 197, following the test of the AC portion of the HEVAC system, the heater portion of the system may be tested as well. One skilled in the art will recognize that the order of testing may be varied. The heater test is described below.

Figure 13A:
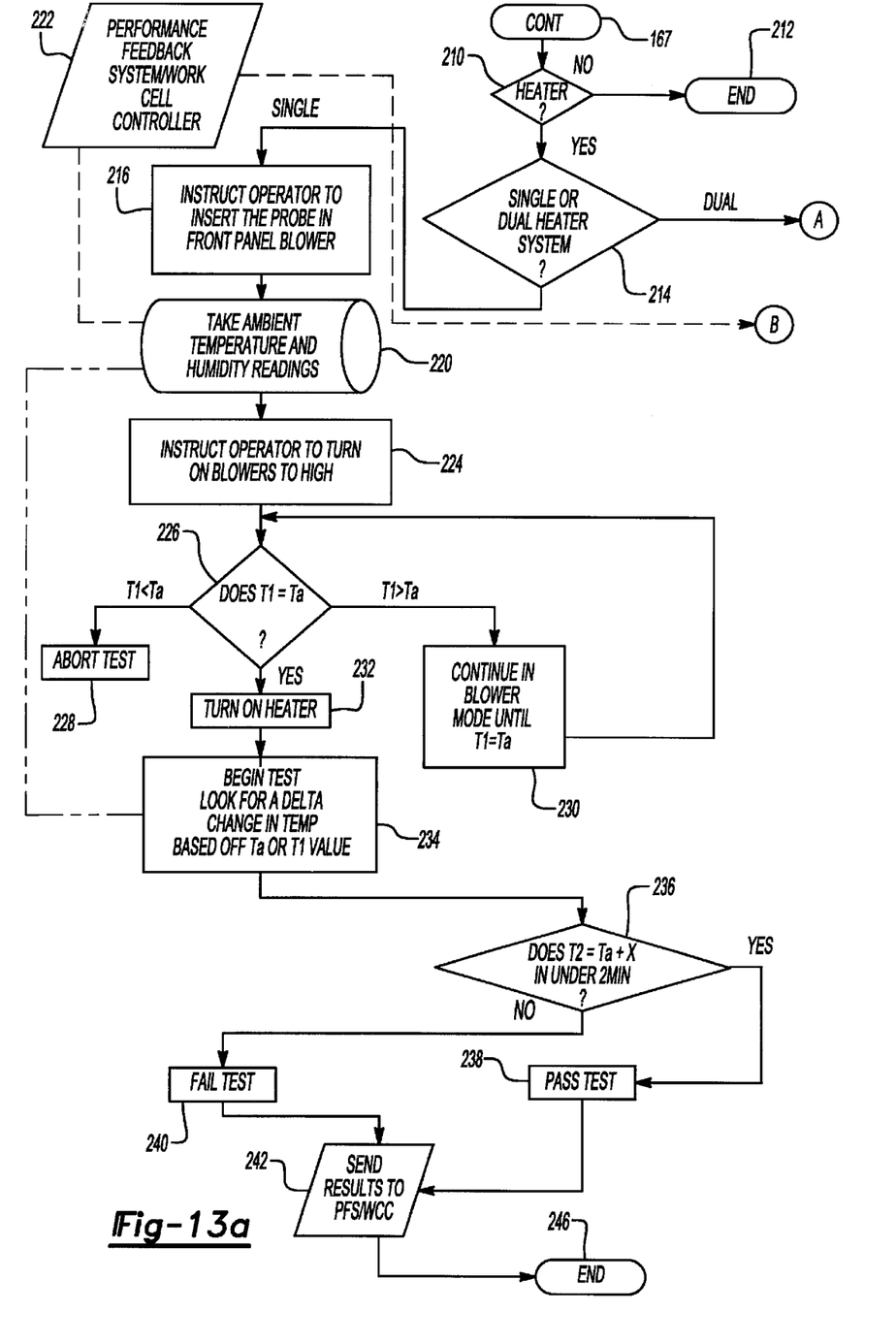
FIGS. 13a and 13b are a block diagram for testing the heating system of the HEVAC system.
Figure 13B:
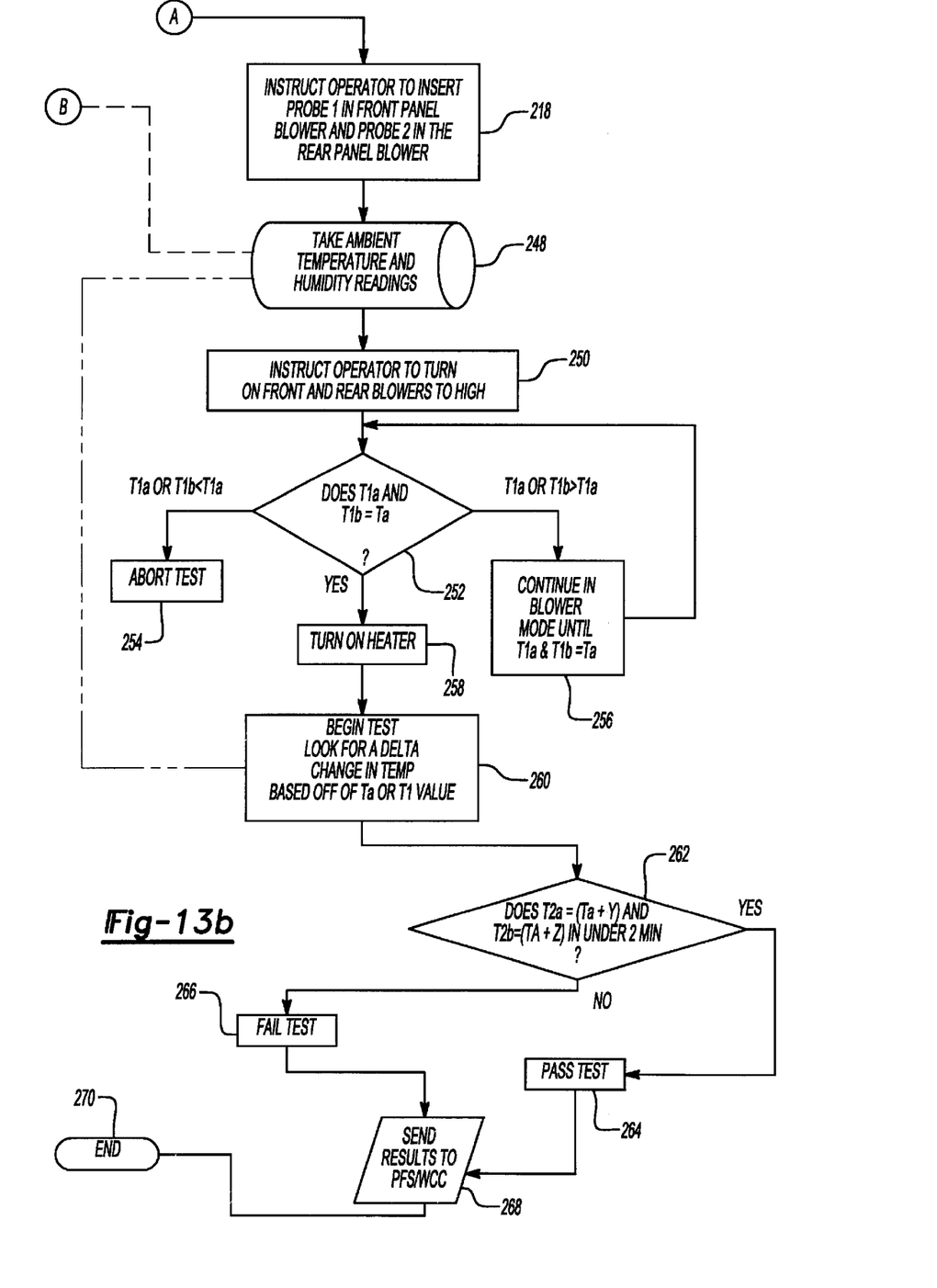

FIGS. 13a and 13b depicts a block diagram of a method for operating the heater test portion of the HEVAC test system 10 of the present invention. Control begins at continuation block 167 which generally indicates the beginning of the heater test methodology. Control then proceeds to decision block 210 which determines whether the vehicle includes a heater system. If the vehicle does not include a heater system, control proceeds to end block 212. If the HEVAC system includes an a heater system, control proceeds to decision block 214. Decision block 214 determines whether the heater system is a single or dual heater (zone) system. The decisions made at decision blocks 210 and 214 may be made as described above with respect to blocks 162 and 166 but would be applicable for the heater system. Generally, vehicles have a heater system, so the vin number would likely define the number of zones in the vehicle.

Returning to decision block 214, if the system is a single zone system, control proceeds to process block 216. If the heater system is a dual zone system, control proceeds to process block 218. With respect to process block 216, tester 30 outputs instructions to the operator on display 48. The instructions direct the operator to insert the temperature probe into the front blower panel or exhaust vent. Control next proceeds to process block 220 where the ambient temperature and humidity readings are taken and stored in performance feedback system (PFS), and work cell controller 222. Control next proceeds to process block 224. At process block 224, test unit 30 provides instructions on display 48 to instruct the operator to turn the blowers to high at the lowest temperature setting. In a fully automated setting, test unit 30 could direct the vehicle through vehicle communication interface 44 to take these steps automatically, thereby eliminating the need to instruct the operator to do so.

Control next proceeds to decision block 226 where a test is performed to determine if the heater temperature (T1) detected by the probe is equal to the ambient temperature (Ta). If heater temperature T1 remains outside of the predetermined range around ambient temperature Ta for a predetermined, configurable time period, control proceeds to process block 228 where the test is aborted because such a scenario indicates that the vehicle can not achieve ambient temperature. Decision block 226 is repeated, as shown at process block 230, for a predetermined time period to enable heater temperature T1 to approach a predetermined, configurable range of temperatures around ambient temperature Ta.

Once the heater temperature T1 is approximately equal to the ambient temperature Ta, control proceeds to process block 232 where the heater system is activated and then to process block 234 which compares a newly determined heater temperature T2 against the ambient temperature Ta or previous heater temperature T1, both values of which are selectable based on plant and vehicle requirements. For this description, Ta will be used.

Control proceeds to decision block 236 where a test is performed to determine if the heater temperature T2 reaches the ambient temperature Ta plus a predetermined, selectable temperature value X in under a selected time period, such as two minutes. If so, control proceeds to process block 238 which generates a code indicating that the heater system has passed the test. If not, control proceeds to process block 238 which generates a code that indicates that the heater system has failed the test. From either of process blocks 238, 240, control proceeds to process block 242 which sends the pass/fail result, the ambient temperature Ta, ambient humidity, the heater temperatures T1 and T2, and other relevant data, with a time stamp to PFS and WCC 174. Control then proceeds to end block 246.

Returning to decision block 214, as stated above, for a dual zone system, front/back, passenger/driver, or other arrangement, control proceeds to process block 218 where a message is output on display 48 of test unit 30 instructing the operator to insert probe 1 into the front panel blower or exhaust vent (a first zone probe) and probe 2 into the rear panel blower or exhaust vent (a second zone probe). Control then proceeds to process block 248 where the ambient temperature Ta and humidity readings are taken through PFS and WCC 174. Control next proceeds to process block 250 where a message is provided on display 48 of test unit 30 instructing the operator to activate the front and rear blowers, i.e., the blowers for both zones, to high and select the lowest temperature setting for both zones. This enables ambient air to flow through the HEVAC system.

Control next proceeds to decision block 252 which runs a test to determine if the heater temperature T1a taken by probe 1 and the heater temperature T1b taken by probe 2 are equal to the ambient temperature Ta. Decision block 252 is repeated for a predetermined time period to enable heater temperatures T1a and T1b to approach a predetermined, configurable range of temperatures around ambient temperature in a predetermined, configurable time period as shown at process block 256. Once the heater temperatures T1 a and T1 b fall within the predetermined range of ambient temperature Ta, control proceeds to process block 257 which activates the AC system and then to process block 258 which begins the test to determine the difference or delta between newly determined heater temperatures T2a and T2b and the ambient temperatures Ta or heater temperature T1, depending upon plant conditions such as ambient temperature and humidity. For the purpose of this description, Ta will be used.

Control proceeds to decision block 262 where a test is performed to determine if the heater temperature T2a is equal to the ambient temperature Ta plus Y degrees, where Y is a selectable temperature, whether the heater temperature T2b is equal to the ambient temperature Ta plus Z degrees, where Z is a selectable temperature, and whether both scenarios occur in less than a selectable time period, such as two minutes. If so, control proceeds to process block 264 which generates a pass code for the heater system. If the above-described temperature changes do not occur in the predetermined time period, control proceeds to process block 266 where a fail code for the test is generated. In either case control next proceeds to process block 268 which sends the pass/fail result, the ambient temperature Ta, the ambient humidity, the heater temperatures T1a, T1b, T2a, T2b, and other relevant data, with a time stamp to PFS and WCC 174. Control then proceeds to end block 195.

In view of the foregoing, one can see that the subject invention provides an automated test apparatus, methodology and a test probe for testing an AC system.

One skilled in the art will recognize that the time periods and temperature thresholds are selectable and may be varied based on particular systems and test criteria.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automated system for testing a heating, ventilation, air conditioner system (HEVAC) unit, comprising:
    an ambient test unit, the ambient test unit including an ambient temperature sensor placed in proximity to a vehicle, the ambient temperature sensor generating an ambient temperature signal that varies in accordance with the ambient temperature;
    an HEVAC temperature sensor placed in proximity to an HEVAC vent, the HEVAC temperature sensor generating an HEVAC temperature signal that varies in accordance with the temperature of air exhausted from the HEVAC vent;
    an HEVAC test controller, the HEVAC test controller varying operation of the HEVAC unit;
    a scanner, the scanner generating a scanner signal in response to passing over a tag, the tag being attached to the vehicle and the scanner signal being used to identify feature content of the vehicle; and
    an HEVAC test unit, the HEVAC test unit receiving the scanner signal, the HEVAC temperature signal and the ambient temperature signal and determining if the HEVAC temperature is within predefined limits in accordance with the feature content of the vehicle, ambient temperature and the operation of the HEVAC unit.

2. The system of claim 1 further comprising memory for storing information about the HEVAC unit of a particular vehicle, wherein the information is provided to the HEVAC test unit to determine if the HEVAC unit is operating properly.

3. The system of claim 2 further comprising a network for enabling communication between the ambient test unit, the HEVAC test unit, and the memory.

4. The system of claim 3 wherein the network further comprises a wireless interconnection between the ambient test unit, the HEVAC test unit, and the memory.

5. The system of claim 1 wherein the HEVAC temperature sensor defines a primary HEVAC temperature sensor, the HEVAC vent defines a primary HEVAC vent, and the HEVAC temperature signal defines a primary HEVAC temperature signal, the system further comprising a secondary HEVAC temperature sensor, the secondary HEVAC temperature sensor being placed in proximity to a secondary HEVAC vent, the secondary HEVAC temperature sensor generating a secondary HEVAC temperature signal that varies in accordance with the temperature of air exhausted from the secondary HEVAC vent.

6. The system of claim 5 wherein the HEVAC test unit receives the primary and secondary HEVAC temperature signals and the ambient temperature signal and determines if the primary and secondary HEVAC temperatures are within predefined limits in accordance with the ambient temperature and the operation of the HEVAC unit.

7. The system of claim 1 wherein the HEVAC test controller is programmable to provide varying predefined limits.

8. The system of claim 1 wherein the HEVAC test unit and the HEVAC test controller are integrated to provide a single test device.

9. The system of claim 1 wherein the HEVAC system tests an air conditioner system.

10. The system of claim 1 wherein the HEVAC system tests a heating system.

11. The system of claim 1 wherein the HEVAC system tests a heating system and an air conditioner system.

12. An automated system for testing a vehicle heating, ventilation, air conditioner (HEVAC) unit, comprising:
    an ambient test unit, the ambient test unit including an ambient temperature sensor placed in proximity to a vehicle, the ambient temperature sensor generating an ambient temperature signal that varies in accordance with the ambient temperature;
    an HEVAC temperature sensor placed in proximity to an HEVAC vent, the HEVAC temperature sensor generating an HEVAC temperature signal that varies in accordance with the temperature of air exhausted from the HEVAC vent;
    a scanner, the scanner generating a scanner signal in response to passing over a tag, the tag being attached to the vehicle and the scanner signal being used to identify feature content of the vehicle; and
    an HEVAC test unit including an HEVAC test controller, the HEVAC test controller varying operation of the HEVAC unit, the HEVAC test unit receiving the scanner signal, the HEVAC temperature signal and the ambient temperature signal and determining if the HEVAC temperature is within predefined limits in accordance with the feature content of the vehicle, ambient temperature and the operation of the HEVAC unit, the HEVAC test unit further, wherein the HEVAC test controller is programmable to vary the predefined limits.

13. The system of claim 12 further comprising memory for storing information about the HEVAC unit of a particular vehicle, wherein the information is provided to the HEVAC test unit to determine if the HEVAC unit is operating properly.

14. The system of claim 13 further comprising a network for enabling communication between the ambient test unit, the HEVAC test unit, and the memory.

15. The system of claim 14 wherein the network further comprises a wireless interconnection between the ambient test unit, the HEVAC test unit, and the memory.

16. The system of claim 15 wherein the HEVAC temperature sensor defines a primary HEVAC temperature sensor, the HEVAC vent defines a primary HEVAC vent, and the HEVAC temperature signal defines a primary HEVAC temperature signal, the system further comprising a secondary HEVAC temperature sensor, the secondary HEVAC temperature sensor being placed in proximity to a secondary HEVAC vent, the secondary HEVAC temperature sensor generating a secondary HEVAC temperature signal that varies in accordance with the temperature of air exhausted from the secondary HEVAC vent.

17. The system of claim 16 wherein the HEVAC test unit receives the primary and secondary HEVAC temperature signals and the ambient temperature signal and determines if the primary and secondary HEVAC temperatures are within predefined limits in accordance with the ambient temperature and the operation of the HEVAC unit.

18. The system of claim 17 wherein the HEVAC system tests at least one of a heating system and an air conditioner system.

* * * * *